(12) United States Patent
Haugen et al.

(10) Patent No.: US 8,272,356 B2
(45) Date of Patent: Sep. 25, 2012

(54) TWO MODE DUAL CRANKSHAFT ENGINE

(75) Inventors: David James Haugen, Ann Arbor, MI (US); Charles L. Gray, Jr., Pinckney, MI (US)

(73) Assignee: The United States of America, as represented by the Administrator of the United States Environmental Protection Agency, Washington, DC (US)

( * ) Notice: Subject to any disclaimer, the term of this patent is extended or adjusted under 35 U.S.C. 154(b) by 279 days.

(21) Appl. No.: 12/827,378

(22) Filed: Jun. 30, 2010

(65) Prior Publication Data

US 2010/0326401 A1    Dec. 30, 2010

Related U.S. Application Data

(60) Provisional application No. 61/221,956, filed on Jun. 30, 2009.

(51) Int. Cl.
    *F02B 75/32*    (2006.01)
(52) U.S. Cl. ...................... 123/53.2; 123/52.4
(58) Field of Classification Search ............. 123/52.4, 123/52.6, 53.2
    See application file for complete search history.

(56) References Cited

U.S. PATENT DOCUMENTS

| | | | | |
|---|---|---|---|---|
| 3,570,459 | A * | 3/1971 | Combs | 123/51 BA |
| 4,255,929 | A * | 3/1981 | Frosch et al. | 60/517 |
| 5,638,777 | A * | 6/1997 | Van Avermaete | 123/52.4 |
| 5,853,308 | A * | 12/1998 | Nanami et al. | 440/89 R |
| 6,508,223 | B2 * | 1/2003 | Laimbock et al. | 123/195 P |
| 6,745,729 | B1 * | 6/2004 | Ebanks | 123/52.4 |
| 7,584,724 | B2 * | 9/2009 | Berger | 123/48 R |
| 7,730,856 | B2 * | 6/2010 | Van Avermaete | 123/48 B |

* cited by examiner

*Primary Examiner* — Erick Solis
(74) *Attorney, Agent, or Firm* — David H. Read

(57) ABSTRACT

A variable displacement engine comprises two engine modules fed from a common fuel source, each engine module having an individual crankshaft. The first engine module has a high compression ratio (e.g., greater than 13:1), while the second module has a typical compression ratio for a gasoline engine (e.g., between 9:1 and 11:1). In one embodiment, the first engine module operates through high efficiency optimized alcohol fuel combustion when the fuel content exceeds a minimum alcohol content. In an alternative embodiment, the first engine module operates at high efficiency through gasoline HCCI combustion when conditions permit. When operating conditions do not permit the first engine module to operate at high efficiency, the second engine module operates as the primary engine module, with the first engine module available to provide supplemental power (at less than optimal efficiency) if needed to meet driver demand.

11 Claims, 3 Drawing Sheets

TWO MODE DUAL CRANKSHAFT ENGINE

CROSS REFERENCE TO RELATED APPLICATION

This application claims priority to U.S. Provisional Application 61/221,956, "Two Mode Dual Crankshaft Engine," filed Jun. 30, 2009.

FIELD OF INVENTION

The present invention relates to the field of internal combustion engines, particularly for automotive use.

BACKGROUND OF THE INVENTION

Various variable displacement internal combustion engine designs are known in the art. Such designs include (i) deactivating one or more cylinders of an engine, such as by cutting off fuel supply to selected cylinders, and (ii) split-engine designs, where one group of cylinders (a cylinder bank) operates independently from another cylinder bank.

U.S. Pat. No. 7,024,858 to Gray, U.S. Pat. No. 4,566,279 to Kronogard, and U.S. Pat. No. 6,306,056 to Moore, each disclose split-engine variable displacement engines with an individual crankshaft provided for each independent cylinder bank in the engine, with the cylinder banks fed from a common fuel source and residing in a common engine block.

While the above-mentioned engine designs provide the potential for improved engine efficiency, it is nevertheless desirable to develop further engine designs with even greater efficiency potential.

OBJECT OF THE INVENTION

Accordingly, the object of the present invention is to provide an internal combustion engine with improved fuel efficiency.

SUMMARY OF THE INVENTION

In a dual-crankshaft variable displacement split-engine with two engine modules, a first engine module is configured to operate at a relatively high compression ratio (above 13:1) and at a particularly high efficiency, while the second engine module is configured to operate at a lower compression ratio more typical for gasoline engines (e.g., a compression ratio between about 9:1 to 11:1, but no more than about 12:1). The two engine modules receive fuel from a common fuel tank.

When operating conditions are such that the first, higher compression ratio, engine module is capable of operating at high efficiency, the first engine module assumes primary operation. In such a condition, the second module is activated and operates only if the first engine module is unable to satisfy driver power demand. On the other hand, when operating conditions are such that the first engine module is not capable of operating at a higher efficiency than the second engine module, the second engine module assumes primary operation. In such a condition, the first module then is activated and operates only if the second engine module is unable to satisfy driver power demand; the first engine module is then enabled for operation through an effective reduction in compression ratio (and thus at less than optimal efficiency).

In two embodiments, the first engine module is configured to operate in a high efficiency alcohol combustion mode upon condition that the fuel in the fuel tank exceeds a certain concentration of alcohol. In an alternative embodiment, the first engine module is configured to operate in gasoline homogenous charge compression ignition (HCCI) mode when operating conditions permit.

DETAILED DESCRIPTION OF THE INVENTION

Figure 1:
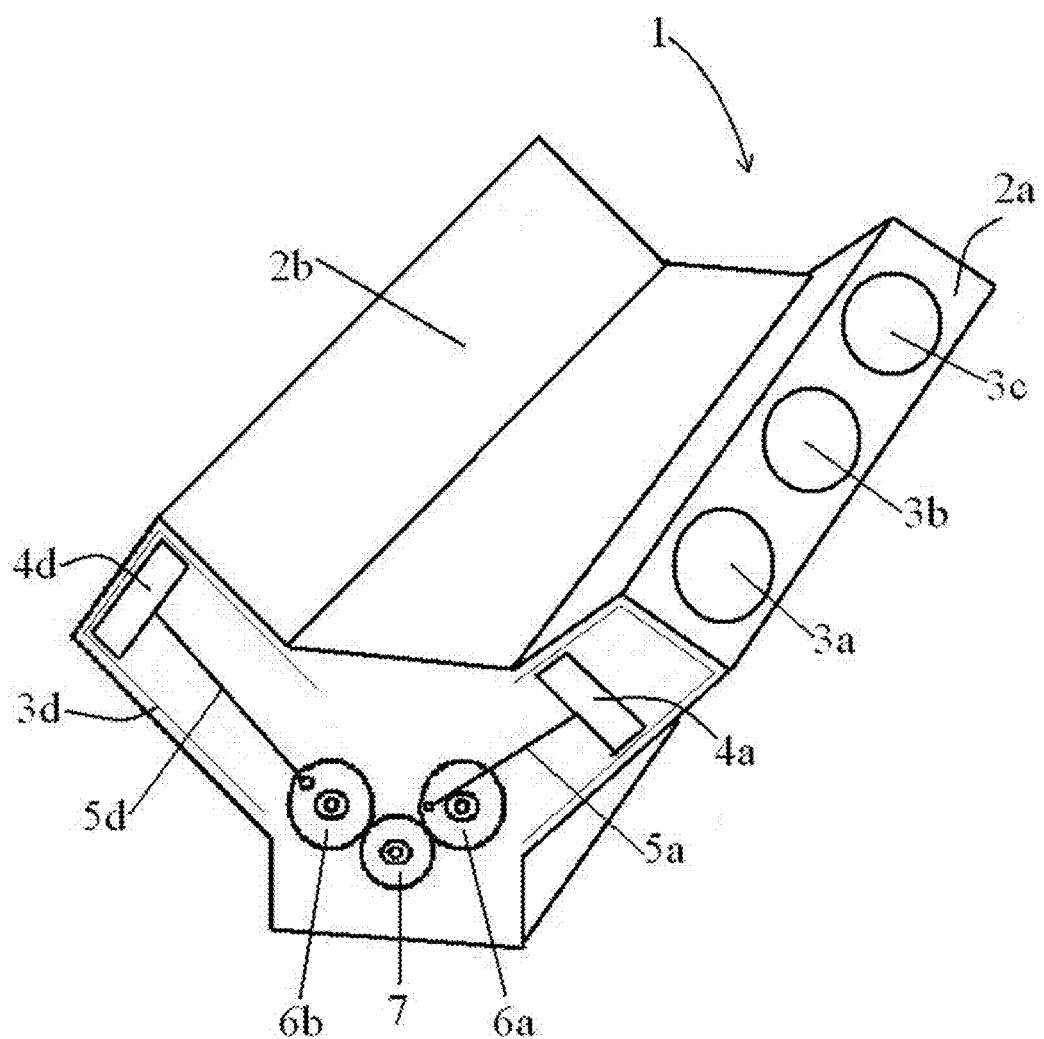
FIG. 1 presents a dual-crankshaft engine with two cylinder banks according to an embodiment of the present invention.
Figure 2:
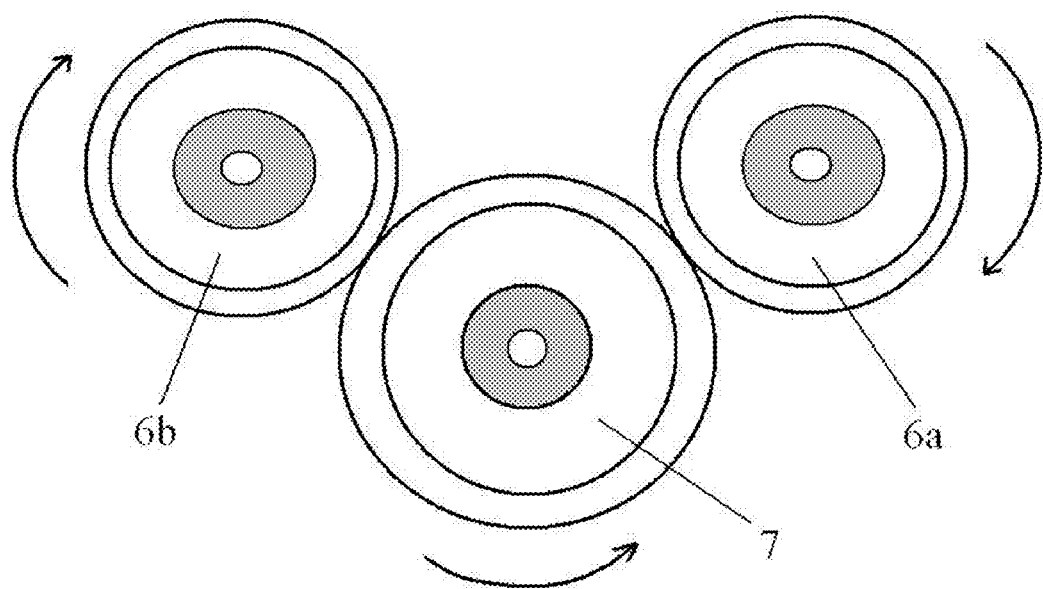
FIG. 2 shows a sample orientation of the two crankshafts and output shaft for one internal combustion engine embodiment of the present invention.

FIG. 1 presents a sample basic configuration for a dual-crankshaft split-engine for the present invention. As illustrated in FIG. 1, engine 1 has two cylinder banks, 2*a* and 2*b*, respectively, with each cylinder bank including a plurality of combustion cylinders 3*a*, 3*b*, 3*c*, etc disposed therein. In the sample embodiment shown in FIG. 1, there are six cylinders 3*a*-3*f*, with cylinders 3*a*-3*c* located in cylinder bank 2*a*, while cylinders 3*d*-3*f* (some not shown) are located in cylinder bank 2*b*. Corresponding combustion pistons 4*a*-4*f* slidingly reciprocate within the combustion cylinders as is known in the art. In the embodiment of FIG. 1, pistons 4*a*-4*c*, in the cylinder bank 2*a*, are each mechanically attached via connecting rods 5*a*-5*c* to a crankshaft 6*a*. On the other hand, pistons 4*d*-4*f*, in the cylinder bank 2*b*, are each mechanically attached via connecting rods 5*d*-5*f* to a crankshaft 6*b*. Crankshafts 6*a* and 6*b* may rotate in the same direction or counter to each other. In the embodiment shown in FIG. 1, and as further shown in FIG. 2, the crankshafts 6*a* and 6*b* rotate in the same clockwise direction, and are drivingly connected (e.g., via gears) to a single engine output shaft 7.

In the present invention, the combustion cylinders in one of the cylinder banks (e.g, cylinder bank 2*b*) are configured to operate at a higher compression ratio than the combustion cylinders in the second cylinder bank. The two banks therefore operate as separate engine modules.

In the most preferred embodiment, the engine 1 may be configured to provide highly efficient flex fuel engine operation. For example, the higher compression ratio engine module 2*b* may be optimized for high efficiency stoichiometric combustion of fuels with relatively high alcohol content. Commonly-assigned U.S. patent application Ser. No. 12/077,378, incorporated by reference herein, describes methods and combustion chamber configurations to obtain high efficiency stoichiometric combustion of alcohol fuels. As one example for the present application, the higher compression ratio engine module would have a compression ratio of between about 16.5:1 to 17.5:1, but greater than or equal to 13:1, and be optimized for highly efficient combustion of fuels with an alcohol content of between about 25% by volume to about 85% by volume. The lower compression ratio engine module would be configured for regular combustion of gasoline (and alcohol fuels) at compression ratios of about 9:1 to 11:1, but less than 12:1.

Under a second embodiment, the higher compression ratio engine module is not configured to handle alcohol fuels, but is instead configured to allow high efficiency gasoline homogenous charge compression ignition (HCCI) combustion. Gasoline HCCI combustion may be achieved through the methods set forth in various commonly-assigned patents, including U.S. Pat. Nos. 7,025,042, 6,651,432, and U.S.

application Ser. No. 12/221,825. The teachings of these patents are incorporated herein by reference. Efficient HCCI combustion may be obtained over a range of compression ratios, with sample compression ratios of 16:1 or 17:1 being typical for optimum efficiency, depending on the engine configuration and other factors. Optimization of the compression ratio for combustion with a given engine configuration is matter of design and testing within the ordinary skill in the art. However, efficient HCCI combustion will require a substantially greater compression ratio than is common for regular gasoline combustion.

Under a third embodiment, the higher compression ratio engine module may be configured to allow lean combustion for improved efficiency. Commonly-assigned U.S. patent application Ser. No. 12/291,076, which is also incorporated herein by reference, describes engine concepts and methods for high efficiency lean combustion of fuels with significant alcohol content. As one example for the present application, the higher compression ratio engine module in this embodiment could have a compression ratio of around 15.5:1, and be optimized for highly efficient lean combustion of E85 or other fuels with a sufficiently low sulfur content. The lower compression ratio engine module would again be configured for regular stoichiometric combustion of gasoline and/or alcohol fuel.

Figure 3:
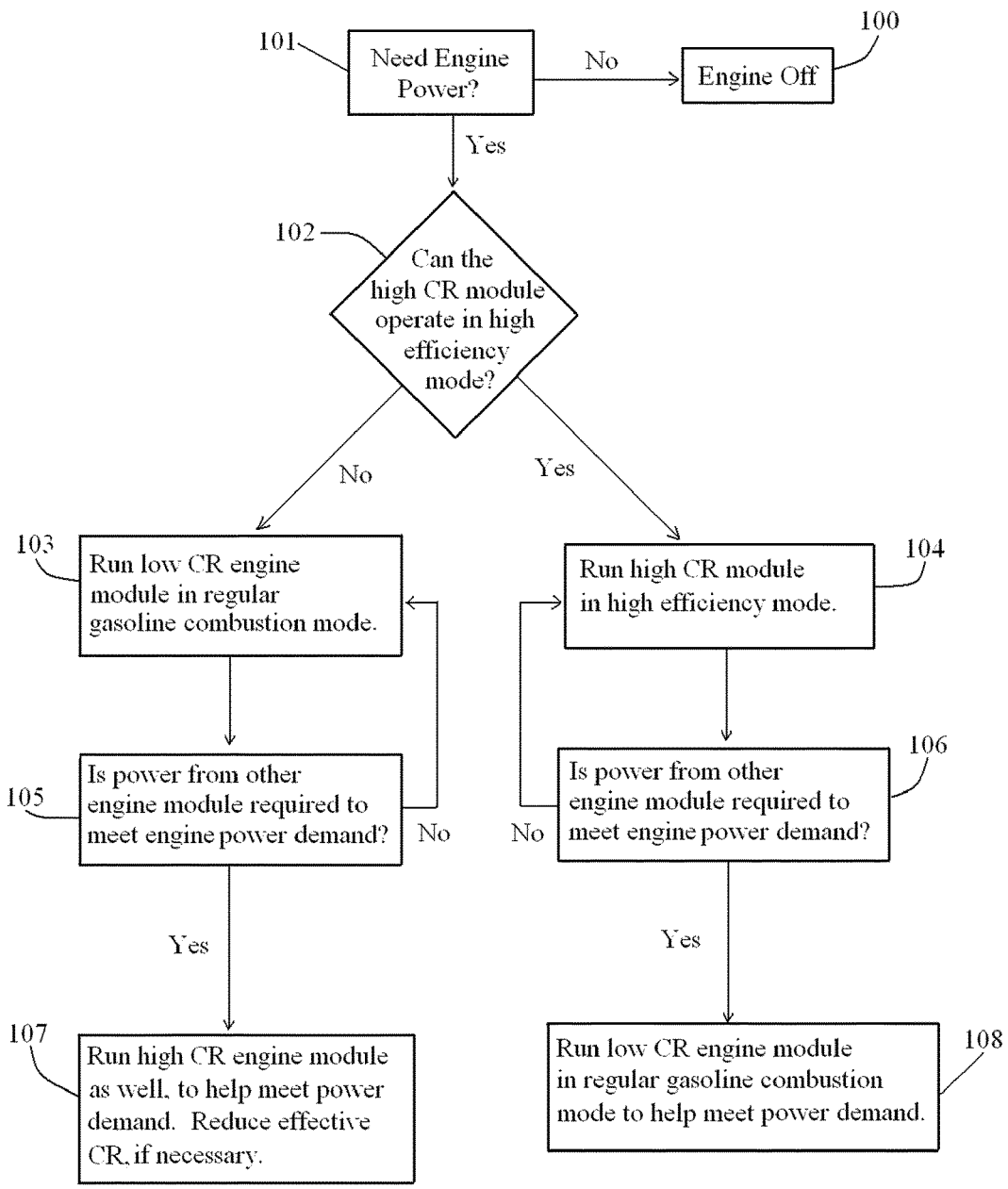
FIG. 3 presents a flow chart describing methods for selecting operation modes for the engine for the embodiments of the present invention.

FIG. 3 presents a method for selecting the operating mode for an engine in accordance with each of the embodiments of the invention. In step 101, it is first decided whether engine power is needed. If not, the engine is off. If engine power output is needed, an engine control module next assesses (in step 102) whether the conditions for engine operation are such that the higher compression ratio engine module can operate in high efficiency mode. For example, for the first embodiment (with high efficiency stoichiometric alcohol combustion in the high compression ratio engine module), this determination may be made through use of a fuel sensor or octane sensor, or by monitoring current engine operating performance, to determine, for example, if the fuel has sufficient alcohol content to allow for high efficiency combustion in the high compression ratio engine module.

For the second embodiment, this determination in step 102 may, for example, be made by checking to see whether one or more pre-conditions necessary for efficient HCCI operation are met, such as meeting a threshold engine warm-up temperature (e.g., monitoring engine coolant temperature and intake charge-air temperatures).

Likewise, for the third embodiment, the engine control module assesses in step 102 whether the conditions for engine operation are such that the higher compression ratio engine module can operate in a lean alcohol combustion mode without causing potential deterioration of the exhaust aftertreatment system. This determination may be made through use of a fuel sensor or octane sensor, or by monitoring current engine operating performance, to determine, for example, if the fuel has sufficient alcohol content (e.g., 50+%, or 85%) to ensure that the sulfur content of the fuel is below a set threshold (e.g, below 15 ppm).

Continuing with FIG. 3 for all of the embodiments, if the engine module can operate in the high efficiency combustion mode, it does so (step 104). Further, in the event it is determined (in step 106) that the power output from the high compression ratio engine module is insufficient to meet the power demanded from the engine, the low compression ratio engine module is also activated (step 108) and operates in a regular gasoline combustion mode to augment power output from the engine. Even if the fuel is an alcohol fuel, the lower compression ratio engine module may operate in its regular combustion mode (termed here "regular gasoline combustion mode"), just as conventional gasoline engines currently may combust E85 and other alcohol fuels.

Referring back now to step 102, for conditions in which the high compression ratio engine module cannot operate in high efficiency mode, the low compression ratio engine module operates in regular gasoline combustion mode (step 103). In the event power from the low compression ratio engine module proves insufficient to meet the demanded engine power output (as determined in step 105), the high compression ratio engine module may also be activated to help meet the power output demand (step 107). The higher compression ratio engine module does not operate in high efficiency mode in this condition. Instead, significant throttling or variable valve actuation (or retarding spark ignition) may be used in this event, in order to reduce the effective compression ratio and allow engine operation of the second module despite the absence of conditions enabling optimally-efficient combustion therein.

It will be understood that the exhaust aftertreatment, exhaust paths, and air handling requirements will vary for the embodiments above. For example, while a conventional three-way catalyst is sufficient for aftertreatment of stoichiometric combustion from the low compression ratio engine module and the high efficiency stoichiometric alcohol combustion of the high compression ratio module in the first embodiment, the HCCI combustion in the second embodiment will require a particulate trap or other device to handle HC/CO emissions from that module, and the lean combustion in the third embodiment will require NOx aftertreatment for the higher compression ratio module. The additional aftertreatment may be provided in a common exhaust pathway for both modules, or as part of a separate exhaust pathway for the higher compression ratio module. Boost requirements for the engine modules may also differ, which may justify use of separate boost systems for the individual modules as well. These differences in combustion system configurations are considered to be outside the scope of this patent application at present.

It should also be noted that in each of the embodiments above, the higher compression ratio engine module may be provided with variable compression ratio technologies to further improve engine efficiencies, if desired, although such options are likely to increase the cost of the engine.

For the lower compression ratio engine module, an Atkinson Cycle or Miller Cycle may also be used for improved efficiency in gasoline combustion, if desired.

As will be understood, the inventions herein may be embodied in other specific forms without departing from the spirit or essential characteristics thereof. The present embodiments are therefore to be considered in all respects as illustrative and not restrictive, the scope of the invention being indicated by the appended claims rather than by the foregoing description.

We claim:

1. An internal combustion engine system with a split-engine, comprising:
   an engine block;
   a first engine module housed in the engine block, said first engine module comprised of a first plurality of combustion cylinders linked to a first crankshaft for rotationally driving the first crankshaft, wherein the first plurality of combustion cylinders are configured to operate at a compression ratio equal to or greater than 13:1;
   a second engine module housed in the engine block, said second engine module comprised of a second plurality of combustion cylinders linked to a second crankshaft for rotationally driving the second crankshaft, wherein the second plurality of combustion cylinders are configured to operate at a compression ratio less than or equal to 12:1;

a fuel tank, fluidly connected to both the first engine module and the second engine module, for providing fuel for combustion in the first or second plurality of combustion cylinders.

2. The engine of claim 1, wherein the first plurality of combustion cylinders are configured to operate at a compression ratio equal to or greater than 15:1.

3. The engine of claim 1, wherein the first plurality of combustion cylinders are configured to operate at a compression ratio equal to or greater than 16:1.

4. The engine of claim 1, wherein the first plurality of combustion cylinders are configured to operate at a compression ratio equal to or greater than 17:1.

5. The engine of claim 1, wherein the first engine module provides stoichiometric combustion of fuels containing an alcohol concentration of at least 25% by volume, with peak engine efficiencies greater than 40%.

6. The engine of claim 1, wherein the first engine module provides lean combustion of E85 fuel, with peak engine efficiencies greater than 40%.

7. A method of operating the internal combustion engine system of claim 1, comprising initiating homogenous charge compression ignition (HCCI) combustion in the first engine module of the split-engine of claim 1, responsive to a determination of operating conditions acceptable for HCCI combustion.

8. A method of operating the engine of claim 1, comprising initiating high efficiency alcohol combustion in the first engine module of the split-engine of claim 1, responsive to a determination that the alcohol content of the fuel is greater than a predetermined threshold.

9. The method of claim 8, wherein the predetermined threshold is 25% alcohol content by volume.

10. The method of claim 8, wherein the predetermined threshold is 50% alcohol content by volume.

11. The method of claim 8, wherein the predetermined threshold is 85% alcohol content by volume.

* * * * *